(12) United States Patent
Domercq et al.

(10) Patent No.: US 8,974,175 B2
(45) Date of Patent: Mar. 10, 2015

(54) TURBOMACHINE COMPRESSOR

(75) Inventors: Olivier Stephane Domercq, Brie Comte Robert (FR); Vincent Paul Gabriel Perrot, Maisons-Alfort (FR)

(73) Assignee: SNECMA, Paris (FR)

( * ) Notice: Subject to any disclaimer, the term of this patent is extended or adjusted under 35 U.S.C. 154(b) by 581 days.

(21) Appl. No.: 13/000,929

(22) PCT Filed: Jun. 15, 2009

(86) PCT No.: PCT/FR2009/000710
§ 371 (c)(1),
(2), (4) Date: Dec. 22, 2010

(87) PCT Pub. No.: WO2010/007224
PCT Pub. Date: Jan. 21, 2010

(65) Prior Publication Data
US 2011/0110773 A1    May 12, 2011

(30) Foreign Application Priority Data

Jun. 25, 2008   (FR) ...................................... 08 03551

(51) Int. Cl.
*F04D 29/68*    (2006.01)
*F04D 29/56*    (2006.01)
(Continued)

(52) U.S. Cl.
CPC ............ *F04D 29/563* (2013.01); *F01D 17/162* (2013.01); *F02C 6/08* (2013.01); *F04D 27/023* (2013.01); *F04D 29/682* (2013.01); *F05D 2270/101* (2013.01); *Y10S 415/914* (2013.01)
USPC .......................................... 415/160; 415/914

(58) Field of Classification Search
CPC ...... F01D 17/16; F04D 29/563; F04D 29/682
USPC .............. 415/52.1, 53.3, 58.7, 140, 141, 159, 415/160, 914, 173.7, 202, 191; 416/90 R, 416/92, 131, 141
See application file for complete search history.

(56) References Cited

U.S. PATENT DOCUMENTS 3,123,283 A    3/1964  Leis
3,542,484 A    11/1970 Mason
(Continued)

FOREIGN PATENT DOCUMENTS

GB    1 286 785       8/1972
GB    2027811 A  *   2/1980
(Continued)

OTHER PUBLICATIONS

"Boundary Layer Theory" by Herrmann Schlichting et al. published by Springer, 2000. Pertinent p. 294. Source: http://books.google.com/books?id=8YugVtom1y4C&pg=PA295&dq=boundary+layer+control+by+blowing+and+suction&hl=en&sa=X&ei=DVceUpmUMO3XsAS6oDwCQ&ved=0CC0Q6AEwAA#v=onepage&q=boundary%20layer%20control%20by%20blowing%20and%20suction&f=false.*

(Continued)

*Primary Examiner* — Nathaniel Wiehe
*Assistant Examiner* — Kayla McCaffrey
(74) *Attorney, Agent, or Firm* — Oblon, McClelland, Maier & Neustadt, L.L.P.

(57) ABSTRACT

A turbomachine compressor including variable-pitch vanes including an aerofoil section connected by a mounting plate of circular outline to a pivot guided in rotation in an orifice in a casing is disclosed. The mounting plate of the vane includes at least one notch for bleeding air from the compressor stream. The notch is intended to communicate with a hole in the casing in order to remove the air bled off when the vanes are in a first position, and to be closed off by this casing when the vanes are in a second position, so that the flow rate of bled air depends on the pitch angle of the vanes.

14 Claims, 3 Drawing Sheets

(51) Int. Cl.
*F01D 17/16* (2006.01)
*F02C 6/08* (2006.01)
*F04D 27/02* (2006.01)

(56) References Cited

U.S. PATENT DOCUMENTS

| | | | |
|---|---|---|---|
| 3,663,118 A | 5/1972 | Johnson | |
| 4,231,703 A * | 11/1980 | Weiler | 415/159 |
| 4,856,962 A | 8/1989 | McDow | |
| 4,861,228 A | 8/1989 | Todman | |
| 2006/0104805 A1 * | 5/2006 | Gummer | 415/58.5 |
| 2008/0298951 A1 * | 12/2008 | Brault et al. | 415/58.5 |

FOREIGN PATENT DOCUMENTS

| | | | |
|---|---|---|---|
| GB | 2 210 935 | | 6/1989 |
| WO | WO2009/062793 | * | 5/2009 |

OTHER PUBLICATIONS

International Search Report Issued Dec. 8, 2009 in PCT/FR09/000710 filed Jun. 15, 2009.
U.S. Appl. No. 13/703,809, filed Dec. 12, 2012, Perrot, et al.
U.S. Appl. No. 12/991,812, filed Nov. 9, 2010, Domercq, et al.

* cited by examiner

Prior art   Fig. 1

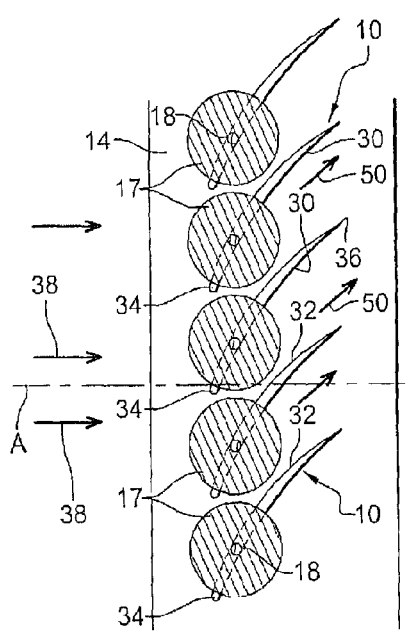
Fig. 2 Prior art
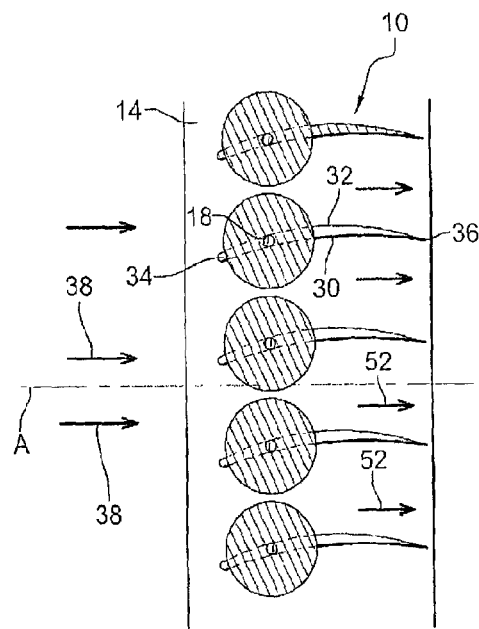
Prior art Fig. 3
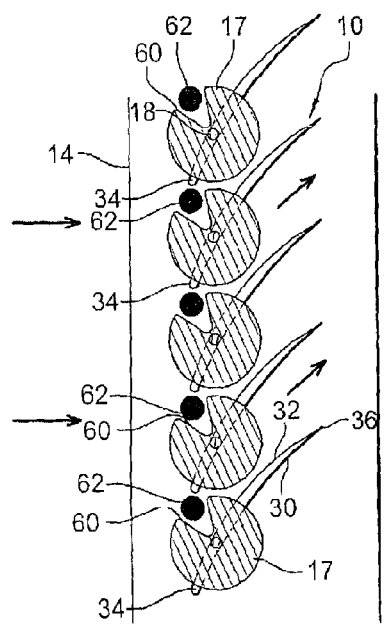
Fig. 4
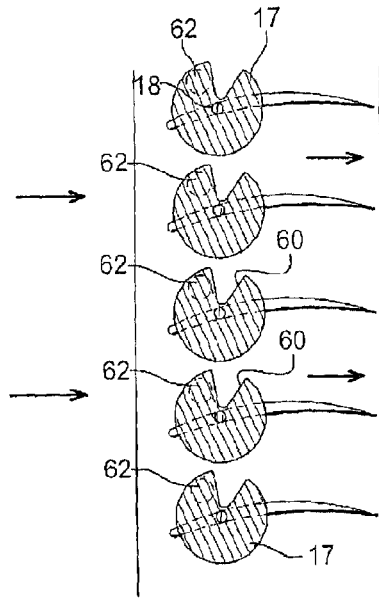
Fig. 5

TURBOMACHINE COMPRESSOR

BACKGROUND OF THE INVENTION

1. Field of the Invention

The present invention relates to a turbomachine compressor such as a turbojet engine or an airplane turboprop engine, comprising at least one stator stage formed by variable-pitch blades.

2. Description of the Related Art

A stator stage of a compressor of this type comprises an annular row of variable-pitch stator blades which are carried by an external casing of the compressor. Each blade comprises an airfoil section which is connected at its radially external end to a radial cylindrical pivot by a mounting plate having an approximately circular contour, said pivot defining the rotational axis of the blade and being guided in rotation in a corresponding orifice in the external casing. The radially internal end of the airfoil section of each blade generally comprises a second cylindrical pivot extending along the rotational axis of the blade and guided in rotation in an orifice in an internal casing of the compressor. In a known manner, the radially external end of the external pivot of each blade is connected by a link rod to a control ring which is rotated about the external casing by a ram or the like. The rotation of the control ring is transmitted by the link rods to the external pivots of the blades and causes them to turn about their axes.

The angular pitch of the stator blades in a turbomachine is intended to adapt the geometry of the compressor to its operating point and in particular to optimize the efficiency and the surge margin of this turbomachine and to reduce its fuel consumption in the various flight configurations.

Each of these blades can be moved in rotation about its axis between a first "open" or "wide open" position, in which each blade extends approximately parallel to the longitudinal axis of the turbomachine, and a second "closed" or "almost closed" position, in which the blades are inclined with respect to the axis of the turbomachine and thus reduce the air flow cross section through the blade stage. When the blades are in the open position, the flow of air flowing through the compressor is at a maximum and when the blades are in the closed position, the flow of air flowing through the compressor is at a minimum (for given operating conditions). The blades can assume intermediate positions between these two extreme positions in order thus to adapt to the variations in the flow of air circulating in the compressor.

When the turbomachine is running at low speed or at idle speed, the variable-pitch blades are brought into their closed position and when the turbomachine is running in full throttle mode (for taking off for example), the blades are brought into their open position.

At low speed, despite the closed position of the stator blades, the angle of incidence between the flow direction of the air in the duct of the compressor and the profile can reach high values which give rise to air separations, further reducing the air flow cross section through the blade stage. These separation regions are mainly located at the radially internal and external ends and disappear when the incidence of the fluid on the blades reaches lower values.

It is known to limit these separations in cascades of stator blades by air bleeds in the regions in question, by virtue of orifices formed in the external or internal casing in the environment of the blades. However, the geometry of these bleeds is generally fixed and, although the bleed is beneficial to given operating conditions of the compressor, its continuous presence, including under conditions where it is not necessary, can affect the performance of the engine (by degrading the efficiency of the compressor and thus the specific consumption). In addition, a fixed bleed geometry limits the optimization capacities of the surge margin of a compressor.

BRIEF SUMMARY OF THE INVENTION

The aim of the invention is in particular to provide a simple, effective and economical solution to these drawbacks.

To this end, it provides a turbomachine compressor, comprising an annular casing and at least one stator stage formed by an annular row of variable-pitch blades, each having an airfoil section connected at least one end to a radial cylindrical pivot by a mounting plate having an approximately circular contour, said pivot being guided in rotation in a corresponding orifice in the casing, it being possible to rotate each blade about an axis defined by the pivot of the blade between a first position and a second position, characterized in that the mounting plates of at least some of the blades each have an orifice for bleeding air out of the duct of the compressor, these orifices being intended to communicate with air-passage holes formed in the casing when the blades are in the first position and to be closed off by the casing when the blades are in the second position, such that the air bleed flow rate depends on the pitch angle of the blades.

Advantageously, the blades can be moved between an open position and a closed position, the orifices of the mounting plates of the blades being intended to communicate with the holes in the casing when the blades are in the closed position or in an intermediate position and to be closed off by the casing when the blades are in the open position.

In the latter case, with the blades in the open position, the orifices in the mounting plates of the blades are closed off by the casing and thus no air is bled. The efficiency of the turbomachine is thus not affected by the bleeding of air at high speeds where the blades are in the open position. When the blades are in the closed position or in an intermediate position, the orifices in the mounting plates of the blades communicate with the holes formed in the casing, thus generating a cross section available to the bleeding of fluid which varies with the pitch angle, enabling a small amount of the flow of air flowing in the duct of the compressor to be bled in order to reduce the abovementioned air separations, thereby improving the performance of the turbomachine at low speed or at intermediate speed.

In other words, the angular pitch of the stator blades allows the flow rate of air bled out of the duct of the compressor to be modulated, this flow rate being zero at full throttle in order that the specific consumption of the engine is not penalized and degraded and having a determined value at low speed in order to reduce the air separations on the blades. The maximum flow rate of air bled represents for example less than 5% of the flow of air flowing out of the duct of the compressor. This flow rate varies depending on the pitch angle of the blades and can reach mean values when the blades are in intermediate positions.

The bleeding of air can take place at the external mounting plate or at the internal mounting plate of each blade, or even at both. The bleeding of air on just one of the mounting plates of each blade makes it possible to avoid the separation of air on the airfoil section of this blade, over approximately its entire radial dimension.

The orifices in the mounting plates of the blades can each have an approximately circular, triangular, elongate, rectangular or trapezoidal form. The orifices in the mounting plates can be indentations in the periphery of the mounting plates.

The holes in the casing can likewise each have an approximately circular, triangular, elongate, rectangular or trapezoidal form.

Advantageously, the orifices in the mounting plates of the blades open into the duct of the compressor at the suction faces of the airfoil sections of these blades. This is because it is at the suction faces of the airfoil sections of the blades that the flow of air flowing in the duct is subjected to a reduced pressure phenomenon promoting the creating of separation regions.

The orifices in the mounting plates can each have a diameter or a transverse dimension greater than that of the holes in the casing such that the flow rates of air bled depend in particular on the diameters or transverse dimensions of the holes in the casing. Alternatively, the orifices in the mounting plates each have a diameter or transverse dimension smaller than that of the holes in the casing. Preferably, bushings for calibrating the flow of the air bled are mounted in the holes in the casing or in the orifices in the mounting plates.

The invention also relates to a turbomachine, such as a turbojet engine, an airplane turboprop engine, a helicopter turbine engine, an industrial machine, or any other machine using a compressor having variable-pitch blading (including a centrifugal compressor), characterized in that it comprises a compressor of the abovementioned type.

Finally, the invention relates to a variable-pitch blade for a compressor as described hereinabove, characterized in that it comprises an airfoil section connected at one end to a cylindrical pivot by a mounting plate having an approximately circular contour, said pivot defining the rotational axis of the blade, the mounting plate having at least one orifice extending approximately parallel to the rotational axis of the blade and opening out at the airfoil section, near the suction face of this airfoil section.

BRIEF DESCRIPTION OF THE SEVERAL VIEWS OF THE DRAWINGS

The invention will be understood more clearly and further details, features and advantages of the present invention will become more clearly apparent from reading the following description, which is given by way of nonlimiting example and with reference to the appended drawings, in which:

FIG. 2 is a partial schematic view of the blade stage in FIG. 1, seen from above, and illustrates the blades in the closed or almost closed position, FIG. 3 is a view corresponding to FIG. 2 and illustrates the blades in the open or wide open position, FIGS. 4 and 5 are partial schematic views of a variable-pitch blade stage of a turbomachine compressor according to the invention, seen from above, and illustrate respectively the blades of this stage in the closed and open positions.

DETAILED DESCRIPTION OF THE INVENTION

Figure 1:
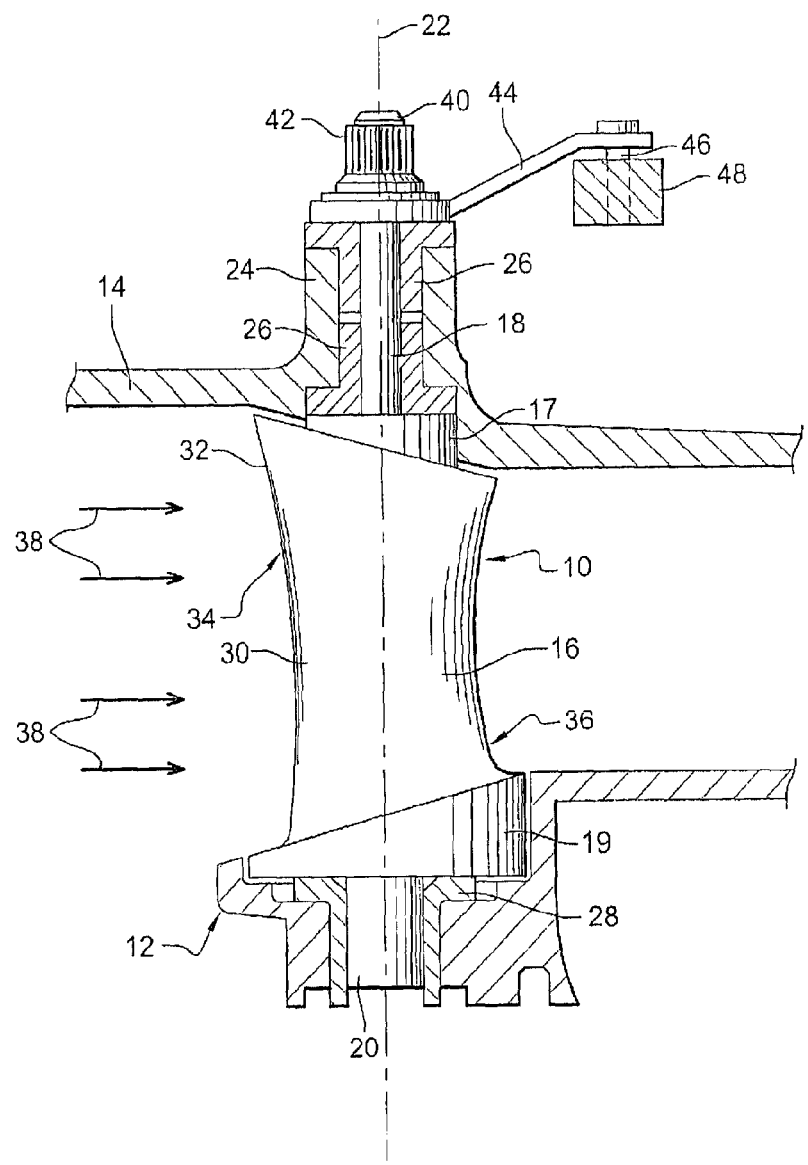
FIG. 1 is a partial schematic half-view in axial cross section of a variable-pitch blade stage of a turbomachine compressor according to the prior art.

Reference is first made to FIG. 1, which shows a stator stage of variable-pitch blades 10 of a high-pressure turbomachine compressor, these blades 10 being distributed regularly around the longitudinal axis of the turbomachine and extending approximately radially between an internal casing 12 and an external casing 14 of the compressor.

Each blade 10 comprises an airfoil section 16 connected at its radially external end to a radial cylindrical pivot 18 by a first mounting plate 17 and at its radially internal end to a radial cylindrical pivot 20 by a second mounting plate 19, the internal pivot 20 and the external pivot 18 defining the rotational axis 22 of the blade.

The external cylindrical pivot 18 is engaged in a cylindrical hollow shaft 24 in the external casing 14 and is guided in rotation in this hollow shaft by cylindrical rings 26. The internal cylindrical pivot 20 is engaged in a cylindrical housing in the internal casing 12 and is guided in rotation in this housing by a cylindrical bushing 28.

The airfoil section 16 of each blade 10 comprises a pressure face 30 and a suction face 32 which are connected together upstream by a leading edge 34 and downstream by a trailing edge 36 for the gases 38 flowing in the duct of the compressor (FIGS. 1 to 3). The internal mounting plate 19 and the external mounting plate 17 each have an approximately circular contour and are housed in recesses of complementary form in the internal casing 12 and the external casing 14, respectively.

The blades 10 can be moved in rotation about their axes 22 between a closed or almost closed position, shown in FIG. 2, and an open or wide open position of this duct, shown in FIG. 3.

In the closed position in FIG. 2, the airfoil sections 16 of the blades are inclined with respect to the longitudinal axis A of the turbomachine and define between one another a minimum air flow cross section in the duct (arrow 50). The blades 10 are brought into this position when the turbomachine is running at low speed or at idle speed, the flow of air flowing in the compressor then being at a minimum.

In the open position in FIG. 3, the airfoil sections 16 of the blades extend approximately parallel to the axis A of the turbomachine such that the air flow cross section between the airfoil sections is at a maximum (arrow 52). The blades 10 are brought into this position when the turbomachine is running at full throttle, the flow of air flowing in the compressor then being at a maximum.

However, in the closed position, separations of air can be observed on the airfoil sections 16, between the mounting plates 17 and 19, on account of the high incidence of the flow on the airfoil sections, these separations disappearing when the blades 10 are close to their nominal operating conditions.

The invention remedies this problem by virtue of an air bleed at the radially internal and/or external ends of the airfoil sections of the blades, this bleed being at a maximum when the blades are in the closed position and being zero when the blades are in the wide open position such that it has no negative effect on the turbomachine performance at high speeds. For this purpose, the air bleed depends on the pitch angle of the blades.

According to the present invention, this air bleed takes place through the orifices in the internal mounting plate and/or the external mounting plate of at least some of the blades of a stage of the compressor, these orifices communicating with holes or apertures in the corresponding casing of the compressor in order to evacuate the air bled.

When the internal mounting plate 19 has such air bleed orifices, holes or apertures for the bled air to pass through are formed in the internal casing 12, and when the external casing 17 has such orifices, holes or apertures for evacuating the bled air are formed in the external casing 14.

For clarity reasons, the exemplary embodiments of the invention that are described in the following text relate only to air bleed orifices formed in the external mounting plates 17 of the blades and intended to communicate with corresponding holes or apertures in the external casing 14. However, these exemplary embodiments are applicable to the internal mounting plates 19 of the blades and to the internal casing 12.

In the embodiment in FIGS. 4 and 5, the blades 10 differ from the blades in FIGS. 1 to 3 in that their external mounting plates 17 each have a through-indentation 60. This indentation 60 extends from the circular edge of the mounting plate towards the rotational axis 22 of the blade. It has an approximately triangular form, the base of which is approximately tangent to the circular edge of the mounting plate 17 and the opposite vertex of which is curved and located close to the external pivot 18 of the blade. The two lateral edges of each indentation 60 are connected to the circular periphery of the mounting plate by corners having a convex rounded form.

The indentation 60 forms an angle of around 50 to 80° around the axis 22. It passes approximately radially through the mounting plate and opens out on the internal face of the mounting plate 17, at the suction face 32 of the airfoil section 16 of the blade where the air is at slightly reduced pressure.

Approximately circular holes 62 are formed in the external casing 14 of the compressor, close to the hollow shafts 24 housing the external pivots 18 of the blades. The number of holes 62 in the casing may be the same as the number of blades 10 or else be an integer multiple of the number of blades.

In the exemplary embodiment in FIGS. 4 and 5, a hole 62 in the casing is formed close to each hollow shaft 24. When the blades are in the closed position (FIG. 4), the holes 62 in the casing are located in line with the indentations 60 and communicate with the latter such that some of the flow of air flowing in the compressor is bled and guided toward the outside of the external casing (this flow of air being at a maximum, which is represented schematically by the completely black circles 62 representing the holes in the casing). This air may be collected in an annular manifold (not shown) which extends around the external casing and into which the holes 62 in this casing open out.

When the blades 10 are in the open position (FIG. 5), the radially external ends of the indentations 60 in the mounting plates no longer communicate with the holes 62 in the casing and thus no air is bled in this way out of the duct of the compressor. In this position, the indentations 60 in the mounting plates are closed off by the casing 14 and the holes 62 in the casing are closed off by the mounting plates 17.

The larger the air flow cross section between an indentation 60 and the corresponding hole 62 in the casing, the larger the flow of air bled. When the indentation 60 is aligned radially with the hole 62 in the casing (FIG. 4), the flow of air bled is at a maximum and depends on the cross section of the hole in the casing, which in this case is smaller than that of the indentation 60. Precise calibration of the flow of air bled is thus possible in this case by controlling the cross section of the hole 62 machined into the casing.

In the particular case of a stage formed from 100 blades distributed regularly around the longitudinal axis of the turbomachine, the total flow of air bled represents for example 5% of the flow of air circulating in the compressor. The flow of air bled through each hole 62 then represents 0.05% of the flow of air in the compressor.

The blades 10 can assume one or more intermediate positions between the positions shown in FIGS. 4 and 5, the flow of air bled then depending on the air flow cross section between the indentations 60 in the mounting plates and the holes 62 in the casing.

Figures 6, 7, 8:
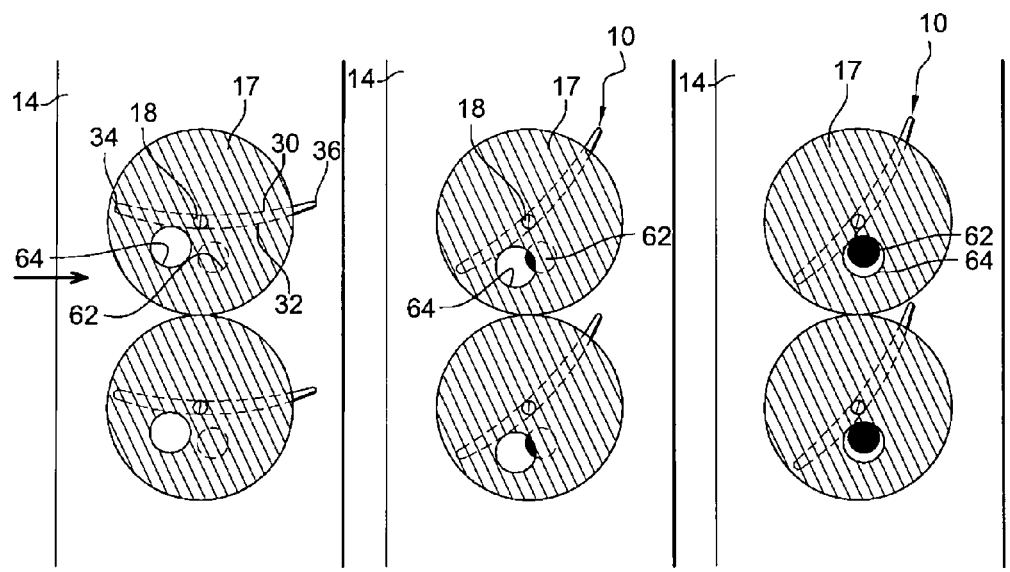
FIGS. 6 to 8 are partial schematic views of a variant embodiment of the variable-pitch blade stage according to the invention, seen from above, and illustrate three particular positions of the blades of this stage.

In the variant embodiment shown in FIGS. 6 to 8, the mounting plates 17 of the blades comprise approximately circular through-orifices 64 for bleeding air. The orifices have in this case a diameter greater than that of the holes 62 in the casing. These orifices 64 have an approximately radial orientation and open out onto the radially internal faces of the external mounting plates of the blades, at the suction faces 32 of the airfoil sections of these blades.

FIG. 6 shows the blades 10 in the open position, in which the orifices 64 in their mounting plates are not aligned and do not communicate with the holes 62 in the casing 14. The flow of air bled is then zero. The blades 10 are in an intermediate position in FIG. 7, where the flow rate bled has a given value, and in a closed position in FIG. 8, where the flow cross section provided for bleeding and defined by the coincidence of the cross sections of the orifices 64 in the mounting plates and those of the holes 62 in the casing is at a maximum.

The indentations 60 and the orifices 64 in the mounting plates, and also the holes 62 in the casing, can have any form desired and have for example a square, triangular, trapezoidal, elongate, oval, circular, etc. form.

Figures 9, 10:
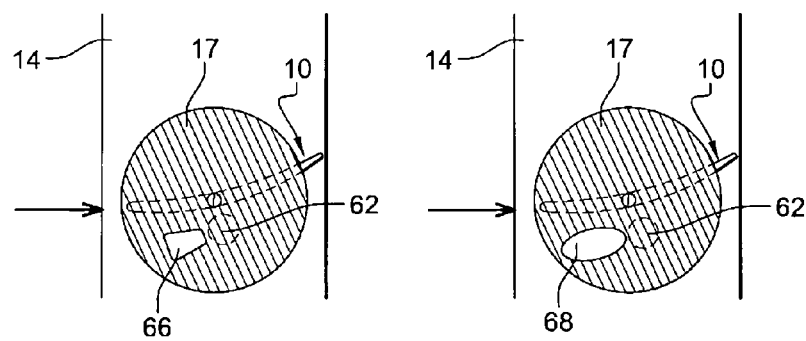
FIGS. 9 and 10 are schematic views of other variant embodiments of variable-pitch blades, seen from above.

In the case of FIG. 9, the orifice 66 in the external mounting plate 17 of the blade has an approximately triangular form, and in the case of FIG. 10, the orifice 68 in the mounting plate 17 has an elongate form. These different forms of the orifices or indentations in the mounting plate and of the holes in the casing make it possible to vary the flow of air bled in a linear or nonlinear manner while the blades rotate around their axes.

The mounting plates 17, 19 of the blades can comprise more than one orifice for bleeding air. In addition, each of these orifices can communicate with more than one hole or aperture in the casing when the blades are in the closed position. The orifices or indentations in the mounting plates and also the holes in the casing have an approximately radial, or even slightly oblique, orientation. Cylindrical bushings, not shown, can be housed in the holes in the casing in order to precisely calibrate the air bleed flow.

The invention claimed is:

1. A turbomachine compressor, comprising:
    an annular casing;
    an air duct; and
    at least one stator stage formed by an annular row of variable-pitch blades disposed into said air duct, each blade having an airfoil section connected at at least one end to a radial cylindrical pivot by a mounting plate having an approximately circular contour, said radial cylindrical pivot being guided in rotation in an orifice in the annular casing, each blade being rotatable about an axis defined by the pivot of the blade between a first position and a second position,
    wherein the mounting plates of at least some of the blades each have an orifice for bleeding air out of the air duct of the compressor, the orifices, which directly communicate with the air duct of the compressor, with no passage for said air through the blades, communicating with holes which are formed through the casing and which evacuate said bleeding air out of the air duct when the blades are in the first position and being closed off by the casing when the blades are in the second position, such that the air bleed flow rate depends on the pitch angle of the blades.

2. The compressor as claimed in claim 1, wherein the blades are movable between an open position and a closed position, the orifices of the mounting plates of the blades being intended to communicate with the holes in the casing when the blades are in the closed position or in an intermediate position and to be closed off by the casing when the blades are in the open position.

3. The compressor as claimed in claim 1, wherein the orifices are formed in radially external mounting plates of the blades and are intended to communicate with holes in an external casing surrounding the blades.

4. The compressor as claimed in claim 1, wherein the orifices are formed in radially internal mounting plates of the blades and are intended to communicate with holes in an internal casing surrounded by the blades.

5. The compressor as claimed in claim 1, wherein the orifices in the mounting plates of the blades each have one of an approximately circular, triangular, elongate, rectangular or trapezoidal form.

6. The compressor as claimed in claim 1, wherein the orifices in the mounting plates of the blades are indentations in the periphery of the mounting plates.

7. The compressor as claimed in claim 1, wherein the holes in the casing each have an approximately circular, triangular, elongate, rectangular or trapezoidal form.

8. The compressor as claimed in claim 1, wherein the orifices in the mounting plates of the blades open into the duct of the compressor at the suction faces of the airfoil sections of these blades.

9. The compressor as claimed in claim 1, wherein the orifices in the mounting plates of the blades each have a diameter or a transverse dimension greater than that of the holes in the casing.

10. The compressor as claimed in claim 1, wherein bushings for calibrating the flow of the air bled are mounted in one of the holes in the casing or the orifices in the mounting plates.

11. A turbomachine, comprising a compressor as claimed in claim 1.

12. A variable-pitch blade for a compressor as claimed in claim 1, said blade comprising an airfoil section connected at at least one end to a cylindrical pivot by a mounting plate having an approximately circular contour, said pivot defining the rotational axis of the blade, the mounting plate having at least one orifice extending approximately parallel to the rotational axis of the blade and opening out at the airfoil section near the suction face of this airfoil section.

13. A turbomachine compressor, comprising:
an annular radially outer casing;
an annular radially inner casing;
an air duct; and
at least one stator stage formed by an annular row of variable-pitch blades disposed into said air duct, each blade having an airfoil section connected:
at a first end to a radial first cylindrical pivot by a first outer mounting plate having an approximately circular contour, said radial first cylindrical pivot being guided in rotation in a first orifice in the annular radially outer casing, and,
at a second end to a radial second cylindrical pivot by a second inner mounting plate having an approximately circular contour, said radial second cylindrical pivot being guided in rotation in a second orifice in the annular radially inner casing,
each blade being rotatable about an axis defined by both the radial first and second cylindrical pivots of the blade between a first position and a second position,
wherein the second inner mounting plates of at least some of the blades each have an orifice for bleeding air out of the air duct of the compressor, the orifices communicating with holes formed through the annular radially inner casing and evacuating said bleeded air out of the air duct, when the blades are in the first position and being closed off by the annular radially inner casing when the blades are in the second position, such that the air bleed flow rate depends on the pitch angle of the blades.

14. A turbomachine compressor, comprising:
an annular casing;
an air duct; and
at least one stator stage formed by an annular row of variable-pitch blades disposed into said air duct, each blade having an airfoil section connected at at least one end to a radial cylindrical pivot by a mounting plate having an approximately circular contour, said radial cylindrical pivot being guided in rotation in a orifice in the annular casing, each blade being rotatable about an axis defined by the pivot of the blade between a first position and a second position,
wherein the mounting plates of at least some of the blades each have an orifice for bleeding air out of the air duct of the compressor, the orifices:
communicating with holes which are formed through the casing and which evacuate therethrough the bleeded air out of the air duct, with no port in the blades for entering said bleeded air into said blades, when the blades are in the first position, and,
being closed off by the casing when the blades are in the second position, such that the air bleed flow rate depends on the pitch angle of the blades.

* * * * *